(12) United States Patent
Aletty et al.

(10) Patent No.: US 11,074,166 B1
(45) Date of Patent: Jul. 27, 2021

(54) SYSTEM AND METHOD FOR DEPLOYING SOFTWARE-DEFINED DATA CENTERS

(71) Applicant: VMWARE, INC., Palo Alto, CA (US)

(72) Inventors: Ashok Aletty, Palo Alto, CA (US); Sri Narayanan Thanga Nadar, Bangalore (IN); Nithin Krishnan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/812,372

(22) Filed: Mar. 9, 2020

(30) Foreign Application Priority Data

Jan. 23, 2020 (IN) .............................. 202041003005

(51) Int. Cl.
  *G06F 9/44* (2018.01)
  *G06F 11/36* (2006.01)
  *G06F 8/61* (2018.01)

(52) U.S. Cl.
  CPC ............ *G06F 11/3688* (2013.01); *G06F 8/63* (2013.01); *G06F 11/3684* (2013.01); *G06F 11/3692* (2013.01)

(58) Field of Classification Search
  None
  See application file for complete search history.

(56) References Cited

U.S. PATENT DOCUMENTS

| | | | | |
|---|---|---|---|---|
| 2017/0078216 A1* | 3/2017 | Adolph | ............... | G06F 11/3409 |
| 2017/0147324 A1* | 5/2017 | Weber | ............... | G06F 11/3668 |
| 2019/0087315 A1* | 3/2019 | Tailor | ............... | G06F 11/3688 |
| 2019/0294531 A1* | 9/2019 | Avisror | ............... | G06F 11/3676 |
| 2019/0361801 A1* | 11/2019 | Roth | ............... | G06F 11/3688 |

* cited by examiner

*Primary Examiner* — Qamrun Nahar
(74) *Attorney, Agent, or Firm* — Loza & Loza, LLP

(57) ABSTRACT

Aspects directed towards deploying a software-defined data center (SDDC) are disclosed. In one example, an SDDC software package is received at a public cloud computing environment in which the SDDC software package facilitates creating an SDDC on a plurality of host computers. A first test of the SDDC is then performed via a first testing server and a second test is performed via a second testing server. For this example, the first test is a generic test of the SDCC corresponding to a generic deployment of the SDDC software package on the plurality of host computers, whereas the second test is a custom test of the SDCC corresponding to a custom deployment of the SDCC software package. A usability of the SDCC is then validated based on at least one of the first test or the second test.

20 Claims, 7 Drawing Sheets

SYSTEM AND METHOD FOR DEPLOYING SOFTWARE-DEFINED DATA CENTERS

RELATED APPLICATIONS

Benefit is claimed under 35 U.S.C. 119(a)-(d) to Foreign Application Serial No. 202041003005 filed in India entitled "SYSTEM AND METHOD FOR DEPLOYING SOFTWARE-DEFINED DATA CENTERS", on Jan. 23, 2020, by VMware, Inc., which is herein incorporated in its entirety by reference for all purposes.

BACKGROUND

Current hybrid cloud technologies allow software-defined data centers (SDDCs) to be deployed in a public cloud, such as the VMware Cloud on Amazon Web Services (AWS) solution, which allows entities, such as enterprises, to modernize, protect and scale their applications leveraging the public cloud. However, it may be desirable to deploy an SDDC to different public cloud environments, wherein each public cloud environment has a unique usage of the same SDDC. Scaling the delivery and acceptance of new SDDC releases to multiple Cloud providers can thus be challenging since troubleshooting these new SDDC bits may vary across different target cloud servers.

Accordingly, it would be desirable to provide a scalable SDDC delivery and acceptance system which overcomes these limitations. To this end, it should be noted that the above-described deficiencies are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards deploying a software-defined data center (SDDC) are disclosed. In one example, a computer-implemented method is disclosed, which includes receiving an SDDC software package at a public cloud computing environment in which the SDDC software package facilitates creating an SDDC on a plurality of host computers. The computer-implemented method further includes performing first test of the SDDC via a first testing server and a second test of the SDDC via a second testing server. For this example, the first test is a generic test of the SDCC corresponding to a generic deployment of the SDDC software package on the plurality of host computers, whereas the second test is a custom test of the SDCC corresponding to a custom deployment of the SDCC software in which the second test is performed in response to the SDDC passing the first test. The computer-implemented method also includes validating a usability of the SDCC based on at least one of the first test or the second test.

In another aspect, a computer system is disclosed. The computer system can include a memory and one or more processors configured to perform various acts. For example, the one or more processors can be configured to receive an SDDC software package at a public cloud computing environment in which the SDDC software package facilitates creating an SDDC on a plurality of host computers. The one or more processors can be further configured to perform a first test of the SDDC via a first testing server and a second test of the SDDC via a second testing server. For this example, the first test is a generic test of the SDCC corresponding to a generic deployment of the SDDC software package on the plurality of host computers, whereas the second test is a custom test of the SDCC corresponding to a custom deployment of the SDCC software in which the second test is performed in response to the SDDC passing the first test. The one or more processors can also be configured to validate a usability of the SDCC based on at least one of the first test or the second test.

In a further aspect, a non-transitory computer-readable storage medium containing program instructions is disclosed. For this example, an execution of the program instructions by one or more processors of a computer causes the one or more processors to perform various steps. For instance, the steps may include receiving an SDDC software package at a public cloud computing environment in which the SDDC software package facilitates creating an SDDC on a plurality of host computers. The steps may further include performing a first test of the SDDC via a first testing server and a second test of the SDDC via a second testing server. For this example, the first test is a generic test of the SDCC corresponding to a generic deployment of the SDDC software package on the plurality of host computers, whereas the second test is a custom test of the SDCC corresponding to a custom deployment of the SDCC software in which the second test is performed in response to the SDDC passing the first test. The steps can also include validating a usability of the SDCC based on at least one of the first test or the second test.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Overview

Figure 1:
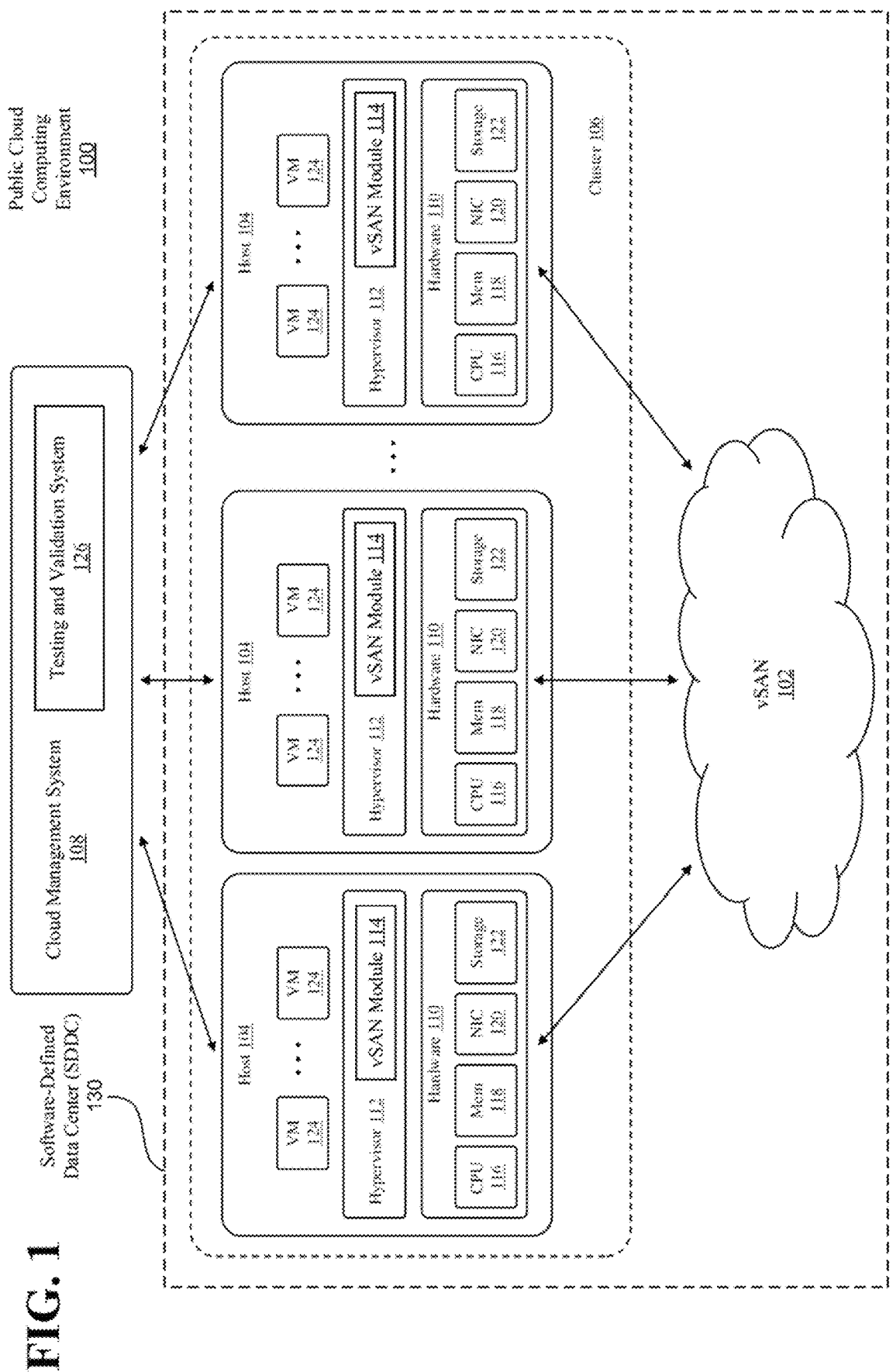
FIG. 1 is a block diagram of a distributed storage system in accordance with an embodiment of the invention.

Bare-Metal cloud solutions are gaining momentum and encountering high demand from enterprises across a variety of different industry verticals. To support the public cloud ecosystem within this emerging information technology (IT) service delivery model, a Software Defined Data Center (SDDC) solution is contemplated, which can be offered to a cloud provider (CP) as part of a bare metal elastic infrastructure service, wherein the CP may participate in a fully automated SDDC software delivery and acceptance process. Moreover, particular aspects disclosed herein are directed towards expediting the delivery and acceptance of new SDDC releases via an automated process that ensures that such releases are adequately tested and validated by any of various CPs, each of which may have their own unique set of testing and validation criteria. To this end it is noted that, whereas acceptance of a new SDDC release via conventional processes is manual and can take several weeks, the processes disclosed herein can validate a new release in less than a day. Indeed, conventional processes for validating new SDDC releases require an administrator of a public cloud to download newly released SDDC binaries, which the administrator then needs to install and validate manually. An automated end-to-end process for releasing, installing, and validating a new SDDC, as disclosed herein, is thus desired.

In a particular aspect, an automated two-stage process for testing and validating the deployment of a newly released SDDC on a cloud provider's system is disclosed. Within such embodiment, it is contemplated that the first stage of this process is facilitated by a first server (e.g., operated by an SDDC producer) and that the second stage of this process is facilitated by a second server (e.g., operated by a cloud provider). For instance, it is contemplated that each stage may leverage an automated orchestration framework (e.g., an open-source software framework) and a set of unique workflows to test various aspects of SDDC lifecycle management (e.g., functional testing and validation). Moreover, it is contemplated that the orchestration framework disclosed herein facilitates an automated process for end-to-end validation of SDDC releases, which removes the need for manual intervention. For instance, a generic version of an SDDC release may be tested in the first stage of the disclosed process, wherein a successful testing of the generic version may automatically trigger testing of a custom version of the SDDC release in the second stage.

Here, it is contemplated that the orchestration framework disclosed herein supports an extensibility feature that accommodates automatically applying extensions to workflows included in the generic version of the SDDC release. For instance, the custom testing of the SDDC performed in the second stage of the process disclosed herein may comprise a custom deployment of the SDDC, wherein extensions to workflows included in the generic version of the SDDC release are automatically applied (i.e., rather than manually applied), and wherein such extensions are specific to a particular cloud provider. The extensible framework disclosed herein thus provides SDDC lifecycle automation for each SDDC instance deployed for a specific cloud provider.

In an exemplary embodiment, the workflows in the first and second stages are implemented using an open source automation server (e.g., a Jenkins server) both as the backbone infrastructure and also as a flexible platform to cater to service provider specific workflows. Within such embodiment, a CP is free to add/extend/replace the factory-provided Stage-1 workflow to represent their unique requirements. The workflow design disclosed herein thus provides pluggable extension-points for the CP to extend the factory workflow. Moreover, the workflow design disclosed herein provides an extensibility capability that can be implemented using any language or platform. During use, it is contemplated that SDDC bits that successfully pass each of the first and second stages are tagged as "Golden Binaries" for use in production deployments.

Exemplary Embodiments

FIG. 1 illustrates a public cloud computing environment 100 in accordance with an embodiment of the invention. As shown in FIG. 1, the public cloud computing environment 100 provides a software-based "virtual storage area network" (vSAN) 102 that leverages local storage resources of host computers 104, which are part of a logically defined cluster 106 of host computers that is managed by a cloud management system 108. The vSAN 102 allows local storage resources of the host computers 104 to be aggregated to form a shared pool of storage resources, which allows the host computers 104, including any software entities or processes running on the host computers, to use the shared storage resources. In a particular embodiment, as illustrated, it is contemplated that the combination of the cluster 106 with the vSAN 102 forms an SDDC 130 that is deployed in that public cloud computing environment 100 using an SDDC package.

The cloud management system 108 operates to manage and monitor the cluster 106 of host computers 104. The cloud management server may be configured to allow an administrator to create the cluster 106, add host computers to the cluster and delete host computers from the cluster. The cloud management server may also be configured to allow an administrator to change settings or parameters of the host computers in the cluster regarding the vSAN 102, which is formed using the local storage resources of the host computers in the cluster. The cloud management server may further be configured to monitor the current configurations of the host computers and any virtual instances running on the host computers, for example, virtual machines (VMs). The monitored configurations may include hardware configuration of each of the host computers and software configurations of each of the host computers. The monitored configurations may also include virtual instance hosting information, i.e., which virtual instances (e.g., VMs) are hosted or running on which host computers. The monitored configurations may also include information regarding the virtual instances running on the different host computers in the cluster.

The cloud management system 108 may also perform operations to manage the virtual instances and the host computers 104 in the cluster 106. As an example, the cloud management server may be configured to perform various resource management operations for the cluster, including virtual instance placement operations for either initial placement of virtual instances and/or load balancing. The process for initial placement of virtual instances, such as VMs, may involve selecting suitable host computers for placement of the virtual instances based on, for example, memory and CPU requirements of the virtual instances, the current memory and CPU loads on all the host computers in the cluster and the memory and CPU capacity of all the host computers in the cluster.

In some embodiments, the cloud management system 108 may be a physical computer. In other embodiments, the cloud management system 108 may be implemented as one or more software programs running on one or more physical computers, such as the host computers 104 in the cluster 106, or running on one or more virtual machines, which may be hosted on any host computers.

As illustrated in FIG. 1, each host computer 104 in the cluster 106 includes hardware 110, a hypervisor 112, and a vSAN module 114. The hardware 110 of each host computer includes hardware components commonly found in a physical computer system, such as one or more processors 116, one or more system memories 118, one or more network interfaces 120 and one or more local storage devices 122 (collectively referred to herein as "local storage"). Each processor 116 can be any type of a processor, such as a central processing unit (CPU) commonly found in a server. In some embodiments, each processor may be a multi-core processor, and thus, includes multiple independent processing units or cores. Each system memory 118, which may be random access memory (RAM), is the volatile memory of the host computer 104. The network interface 120 is an interface that allows the host computer to communicate with a network, such as the Internet. As an example, the network interface may be a network adapter. Each local storage device 122 is a nonvolatile storage, which may be, for example, a solid-state drive (SSD) or a hard disk drive (HDD).

The hypervisor 112 of each host computer 104, which is a software interface layer that, using virtualization technology, enables sharing of the hardware resources of the host computer by virtual instances 124, such as VMs, running on the host computer. With the support of the hypervisor, the VMs provide isolated execution spaces for guest software.

The vSAN module 114 of each host computer 104 provides access to the local storage resources of that host computer (e.g., handle storage input/output (I/O) operations to data objects stored in the local storage resources as part of the vSAN 102) by other host computers 104 in the cluster 106 or any software entities, such as VMs 124, running on the host computers in the cluster. As an example, the vSAN module of each host computer allows any VM running on any of the host computers in the cluster to access data stored in the local storage resources of that host computer, which may include virtual disks (or portions thereof) of VMs running on any of the host computers and other related files of those VMs. Thus, the vSAN modules of the host computers in the cluster control data that are written on the local storage devices of the host computers.

In the embodiment illustrated in FIG. 1, the cloud management system 108 includes a testing and validation system 126 that facilitates deploying SDDC software packages in accordance with aspects disclosed herein. Moreover, as will be discussed in more detail below, it is contemplated that the testing and validation system 126 may be configured to facilitate automating the installation, testing, and validation of SDDC releases on the host computers 104 in the cluster 106 in accordance with aspects disclosed herein. In an implementation, the testing and validation system 126 includes at least a first server configured to test and validate a generic version of an SDDC release, and a second server configured to test and validate a custom version of the SDDC release. Within such embodiment, it should be appreciated that the first and second servers may be any server generally known in the art including, for example, a VMware vCenter™ server with at least some of the features available for such a server.

Figure 2:
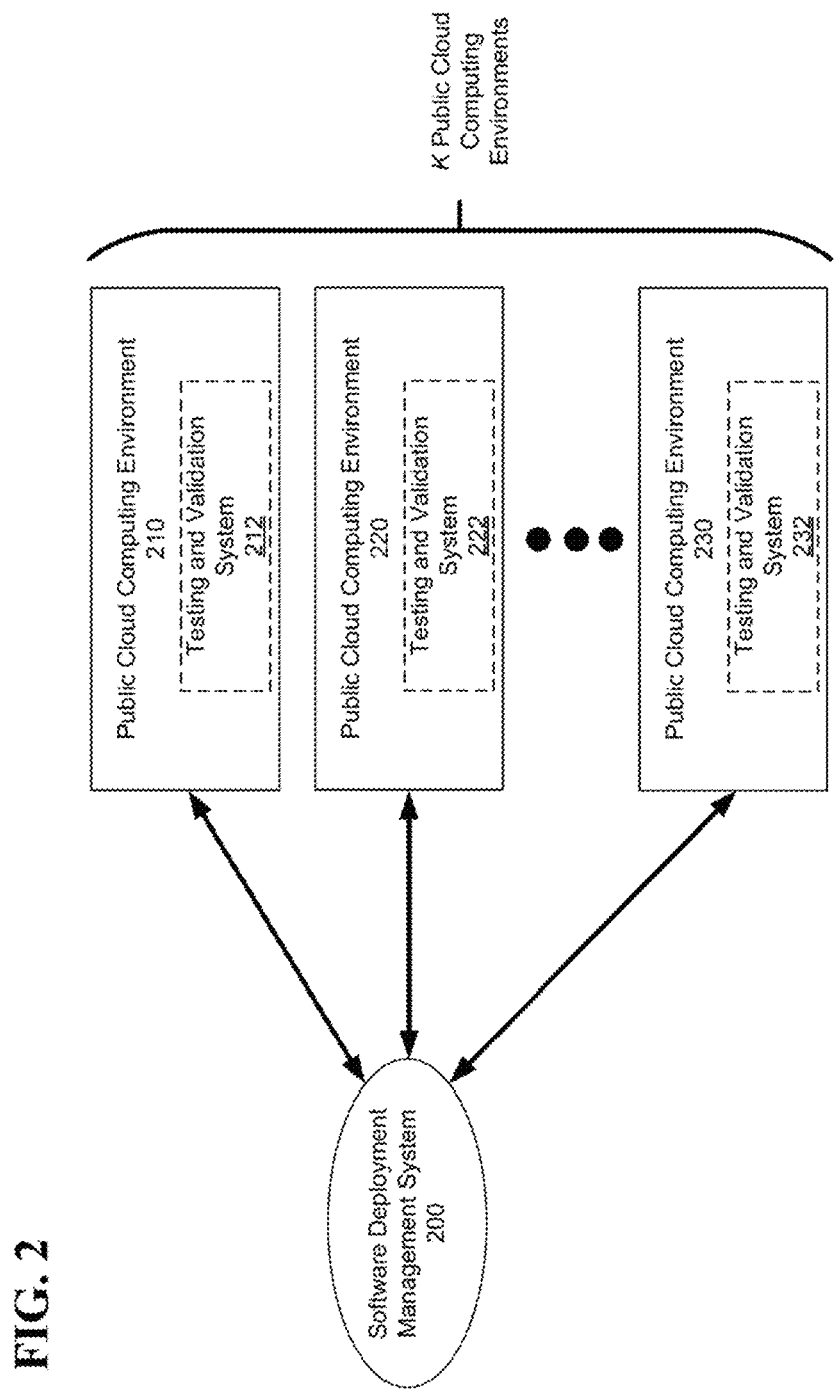
FIG. 2 is a block diagram of an exemplary software deployment management system coupled to a plurality of cloud storage systems in accordance with an aspect of the invention.

Referring next to FIG. 2, a block diagram is provided of an exemplary software deployment management system 200 coupled to a plurality of public cloud computing environments 210, 220, and/or 230 in accordance with an aspect of the invention. Here, it is contemplated that the software deployment management system 200 may be configured to deploy SDDC releases to any of the plurality of public cloud computing environments 210, 220, and/or 230. As illustrated, each of the plurality of public cloud computing environments 210, 220, and 230, may respectively include a corresponding testing and validation system 212, 222, and 232, wherein each of the testing and validation systems 212, 222, and 232 are substantially similar to the testing and validation system 126 illustrated in FIG. 1.

Figure 3:
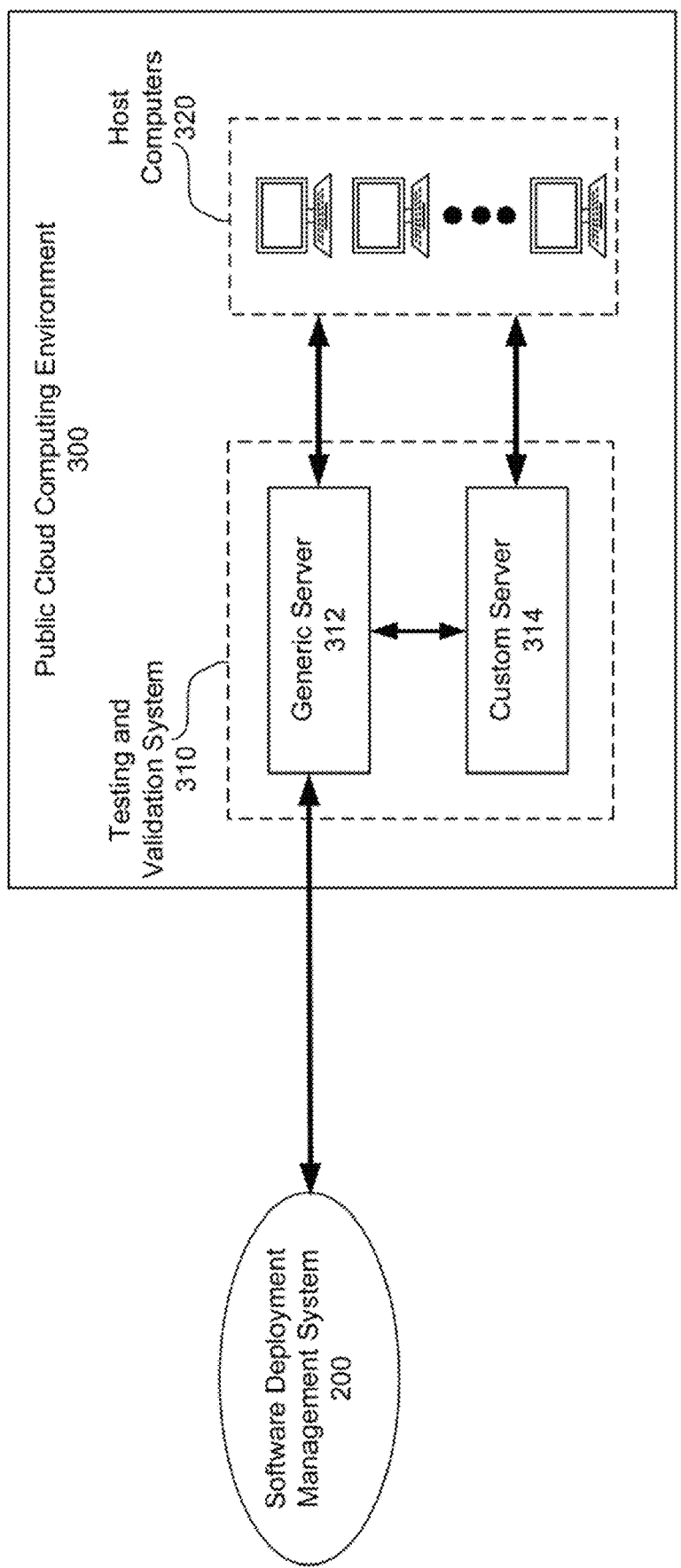
FIG. 3 is a block diagram of the software deployment management system illustrated in FIG. 2 coupled to an exemplary public cloud computing environment in accordance with an aspect of the invention.

Referring next to FIG. 3, a block diagram is provided of the software deployment management system 200 illustrated in FIG. 2 coupled to an exemplary public cloud computing environment in accordance with an aspect of the invention. As illustrated, the software deployment management system 200 is coupled to a public cloud computing environment 300, wherein the public cloud computing environment 300 comprises a testing and validation system 310 coupled to a plurality of host computers 320. Here, it should be appreciated that the testing and validation system 310 is substantially similar to the testing and validation systems 126, 212, 222, and 232 respectively illustrated in FIGS. 1-2.

In a particular aspect, it is contemplated that the testing and validation system 310 can include a memory and one or more processors configured to perform various acts. For example, the one or more processors can be configured to receive an SDDC software package from the software deployment management system 200, wherein the SDDC software package facilitates creating an SDDC on the plurality of host computers 320. The one or more processors can be further configured to perform a first test of the SDDC via a generic server 312 and a second test of the SDDC via a custom server 314. For this example, the first test is a generic test of the SDCC corresponding to a generic deployment of the SDDC software package on the plurality of host computers 320, whereas the second test is a custom test of the SDCC corresponding to a custom deployment of the SDCC software in which the second test is performed in response to the SDDC passing the first test. For this example, the one or more processors are also configured to validate a usability of the SDCC based on at least one of the first test or the second test.

Various additional aspects for the software deployment management system 200 are also contemplated. For instance, it is contemplated that the one or more processors are configured to automate a plurality of lifecycle workflows included in the SDDC software package. Within such embodiment, the one or more processors may be further configured to control an automation of the plurality of lifecycle workflows via commands received from an external controller (e.g., the software deployment management system 200). In another aspect, it is contemplated that the plurality of lifecycle workflows included in the SDDC software package are extensible, wherein the custom deployment comprises deploying a revised version of the plurality of lifecycle workflows included in the SDDC software package.

With respect to allocating resources, it should be appreciated that the deployment of the SDDC can be performed in any of various ways. For instance, the one or more processors may be configured to utilize at least a first of the plurality of host computers 320 to facilitate calling an SDDC instance. The one or more processors may also be configured to utilize at least a second of the plurality of host computers 320 to facilitate testing an addition or removal of host computers 320, and further configured to utilize at least a third of the plurality of host computers 320 to facilitate testing a revision of the plurality of lifecycle workflows included in the SDDC software package.

Figure 4:
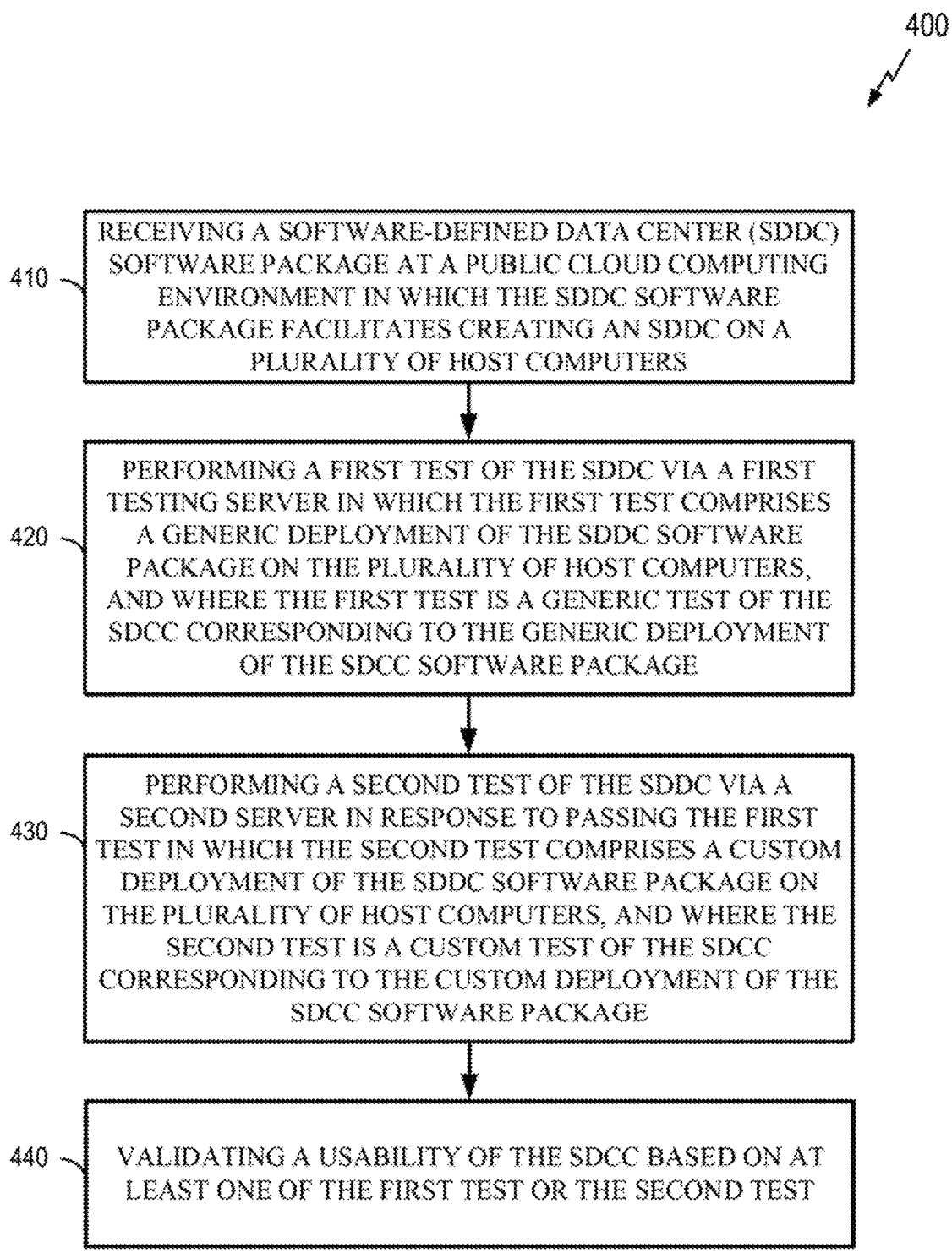
FIG. 4 is a flow diagram of a method of deploying software to a plurality of cloud storage systems in accordance with an embodiment of the invention.

Referring next to FIG. 4, a flow chart illustrating an exemplary method that facilitates deploying an SDDC according to an embodiment is provided. As illustrated, process 400 includes a series of acts that may be performed by a system that includes at least one computing device (e.g., testing and validation system 126) according to an aspect of the subject specification. For instance, process 400 may be implemented by employing a processor to execute computer executable instructions stored on a computer readable storage medium to implement the series of acts. In another embodiment, a computer-readable storage medium comprising code for causing at least one computer to implement the acts of process 400 is contemplated.

In an aspect, it is contemplated that process 400 may facilitate automating a plurality of lifecycle workflows included in an SDDC software package. For instance, process 400 may begin with the testing and validation system 126 receiving an SDDC software package at act 410, wherein the SDDC software package facilitates creating an SDDC on a plurality of host computers (e.g., host computers 320). At act 420, process 400 continues with the testing and validation system 126 performing a first test of the SDDC via a first testing server (e.g., generic server 312). Here, it should be appreciated that the first test is a generic test of the SDCC corresponding to a generic deployment of the SDCC software package on the plurality of host computers (e.g., host computers 320).

In response to passing the first test, process 400 then continues at act 430 with the testing and validation system 126 performing a second test of the SDDC via a second server (e.g., custom server 314). Here, it should be appreciated that the second test is a custom test of the SDCC corresponding to a custom deployment of the SDCC software package on the plurality of host computers (e.g., host computers 320). Moreover, it is contemplated the plurality of lifecycle workflows included in the SDDC software package are extensible, wherein the custom deployment comprises deploying a revised version of the plurality of lifecycle workflows included in the SDDC software package (i.e., where each public cloud computing environment has a CP-specific version of the lifecycle workflows included in the SDDC software package). For instance, the custom deployment of a particular CP may comprise adding a new lifecycle workflow to the plurality of lifecycle workflows included in the SDDC software package. A custom deployment may also comprise deleting and/or revising at least one of the plurality of lifecycle workflows included in the SDDC software package.

After performing the second test at act 430, process 400 then concludes at act 440 with the testing and validation system 126 validating a usability of the SDCC based on at least one of the first test or the second test. For instance, if the SDCC fails the first test, the testing and validation system 126 may conclude that the SDCC has a factory-specific issue that renders the SDCC unusable. Otherwise, if the SDCC passes the first test, the testing and validation system 126 may validate a usability of the SDCC based on the second test. If the SDCC fails the second test, the testing and validation system 126 may conclude that the SDCC has a CP-specific issue that renders the SDCC unusable. If the SDCC passes both the first test and the second test, however, the testing and validation system 126 may validate that the deployment of the SDCC is indeed usable.

Exemplary Implementations

Aspects disclosed herein include implementations that enable bare-metal CPs to offer SDDC-as-a-service, wherein the services are owned and operated by the individual CPs. To this end, it is contemplated that CPs may use a VMware Cloud Provider Stack (VCPS), which may generally be defined as an SDDC bundle that includes the SDDC product components (e.g., VMware vSphere, vSAN, and NSX-T components) necessary to deploy an SDDC and manage its lifecycle. The SDDC lifecycle automation may be provided through a CP Pod SDDC (PODS), which is a novel component disclosed herein designed to help with the bring up of key SDDC lifecycle workflows.

As previously discussed, a two-stage CP pipeline is contemplated to completely automate the delivery and acceptance of new SDDC releases from an SDDC developer. Here, it is contemplated that PODS may be configured to leverage an open source automation server (e.g., a Jenkins server) for workflow orchestration and to provide a set of pipelines that represent unique lifecycle workflows that are tested and validated as part of the automated acceptance process disclosed herein. The open source automation server (e.g., a Jenkins server) can also then be leveraged later by the CP to manage the SDDC lifecycle for their customers. These lifecycle workflows may thus be readily extended or replaced by the CP to customize it to their unique requirements. In addition, the CPs can add new pipelines to support other workflows such as deploying new custom/ISV services and managing their lifecycle. With the two-stage delivery and acceptance process disclosed herein, an SDDC developer may thus scale the delivery and acceptance of SDDC releases to a larger volume of CPs, wherein the PODS provide an extensible framework for CPs to mold it to their unique requirements, and wherein the time for accepting and troubleshooting new SDDC bits on target cloud servers is significantly reduced.

In a particular aspect, it is contemplated that the first stage of the two-stage fully automated SDDC binary delivery and acceptance process disclosed herein is a test performed by one or more servers operated by an SDDC developer, wherein such first stage test is common across all CPs served by the SDDC developer. It is further contemplated that this test is fully automated with no manual intervention required at any point in the process. Moreover, an objective of this first stage is to test new SDDC releases and factory SDDC lifecycle automation workflows on target cloud servers. Any errors or failures in this stage would likely be a compatibility issue associated with the SDDC developer, which the SDDC developer can then try to resolve with minimal involvement from the CP. It is thus contemplated that this first stage may include a set of SDDC automation workflows and set of SDDC reference design and functional test validation workflows.

Upon successfully completing the first stage, a new SSDC release then proceeds to a second stage of testing. In this second stage, it is contemplated that testing is performed by servers operated by the CP, wherein the CP is free to add/extend/replace factory automation workflows, custom ESXi vSphere installation bundle (VIB), and/or 3rd party software to validate their production equivalent environment on the target cloud servers with the new SDDC release. Any failure in this stage would suggest that the failure is due to a CP environment issue, which would require minimal involvement from the SDDC developer.

As previously stated, it is contemplated that each of the first and second stage SDDC lifecycle management workflows, as well as the corresponding validation and functional test suites, are orchestrated using an open source automation server (e.g., a Jenkins server). In a particular aspect, every SDDC lifecycle management (LCM) workflow is delivered as a pipeline with one or more stages that calls a "specific function" that can be implemented using any language or any open source automation framework (e.g., Ansible, Terraform etc.). This approach provides a very extensible framework, which enables a CP to readily add/extend/ replace factory-provided workflows. It is contemplated that such extension mechanism may be supported via hooks into the individual workflows where the pipeline-to-extension mapping may be maintained in a JavaScript Object Notation (JSON) file. It is further contemplated that patch workflows may be implemented using a VMware Cloud (VMC) pod-service, wherein a REST application program interface (API) may also be used to trigger individual pipelines.

Figure 5:
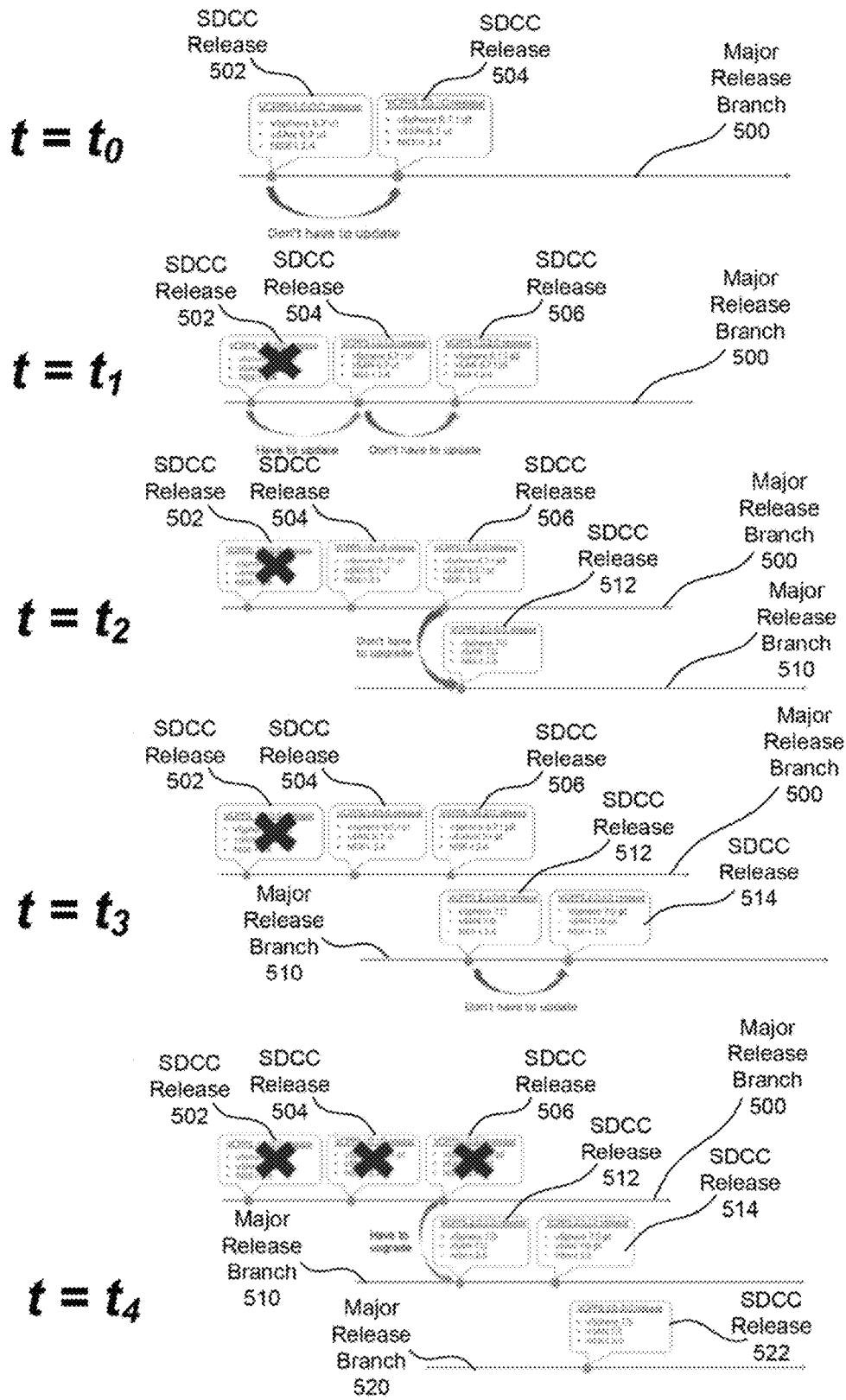
FIG. 5 is a time lapse diagram of an exemplary software package release in accordance with an aspect of the invention.

Aspects disclosed herein are also directed towards designing a prescriptive SDDC binaries release cadence and adoption rate by the CP, while also providing flexibility to the end customers on a release to adopt. As illustrated in the time lapse provided in FIG. 5, an exemplary embodiment is contemplated in which at most two major release branches (N & N−1) are supported, wherein each of the two major release branches may support at most two SDCC releases. For instance, at $t=t_0$, a first major release branch 500 comprises a first SDCC release 502 and a second SDCC release 504. Therefore, because there is a single major release branch 500, and the single major release branch 500 includes only two SDCC releases 502 and 504, no update is required from the customer. At $t=t_1$ however, because a third SDCC release 506 is released on the major release branch 500, an update is required, wherein the first SDCC release 502 is removed, and the second and third SDCC releases 504 and 506 are maintained. At $t=t_2$, an SDCC release 512 is then released on a second major release branch 510, as shown. Here, because the SDCC release 512 is the first SDCC release on the second major release branch 510, no update is required. A second SDCC release 514 is then released on the second major release branch 510 at $t=t_3$. Since neither the first major release branch 500 or the second major release branch 510 have more than two releases at $t=t_3$, no update is required. And finally, at $t=t_4$, a first SDCC release 522 is released on a third major release branch 520, as shown. Here, because only two major release branches are supported, an update is required in which all the SDCC releases in the first major release branch 500 are deleted (i.e., SDCC releases 504 and 506 are deleted at $t=t_4$, wherein SDCC release 502 was already deleted at $t=t_1$). For the embodiment illustrated in FIG. 5, there can thus be at most four SDDC releases that are supported at any time, wherein the end customer deploys one of the four supported releases. It should also be appreciated that the PODS disclosed herein may be configured to support fully automated patches and updates within a major release and upgrades across all major releases.

In another aspect of the disclosure, it is contemplated that all deliverables, including the SDDC software package, may be hosted in a secure location (e.g., an S3 location), which can be consumed via an API. The first stage, for example, may be configured with credentials of the secure location that only have read access to the hosted repository. It is further contemplated that execution of the first stage may occur in a virtual machine (e.g., a 16 GB/8CPU/500 GB virtual machine (VM)) hosted in a sandbox environment of the CP environment, wherein an open source automation server (e.g., a Jenkins server) may be configured on the VM.

The CP may also be asked to allocate hardware resources for the SDCC developer. For instance, in an exemplary implementation, the SDCC developer may request nine vSAN-ready nodes configured with ESXi-compatible software. Within such embodiment, four of the nine nodes may be used to bring-up an SDDC instance, one of the nine nodes may be used to test the ADD/REMOVE HOST functionality to the existing cluster, and another four of the nine nodes may be used to test the ADD/REMOVE CLUSTER workflows. For some embodiments, the machines may be required to be identical in terms of hardware within a cluster.

In another aspect of the disclosure, the first stage includes a master orchestrator pipeline that orchestrates the end-to-end testing of new SDCC releases and the SDDC lifecycle automation. It should also be appreciated that the first stage may be triggered using two parameters: 1) the Uniform Resource Locator (URL) to the root manifest of the new SDCC release software package, and 2) the previous release both of which may be stored in the S3 repository.

Figure 6:
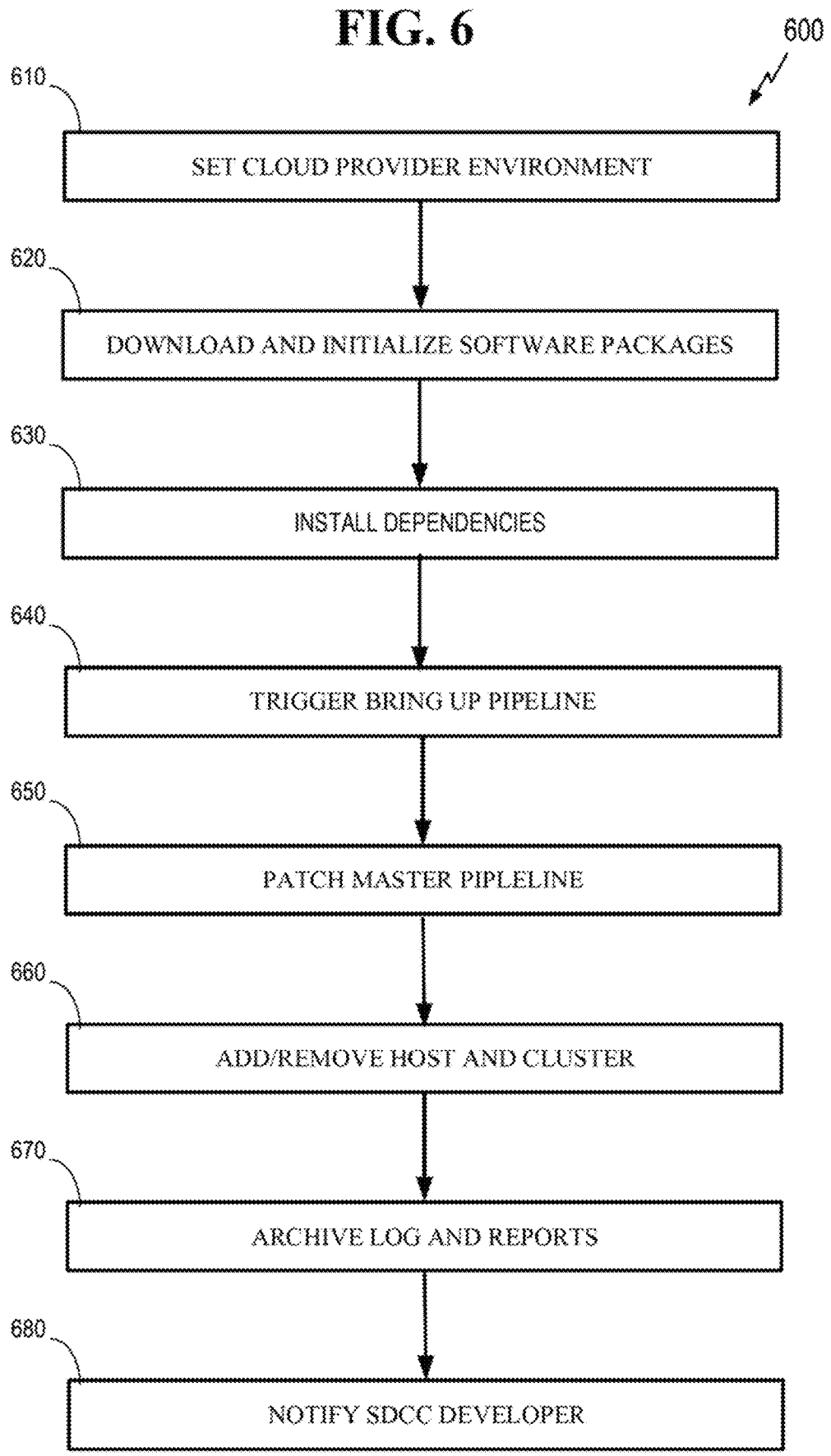
FIG. 6 is a flow diagram illustrating an exemplary functionality of a master orchestrator in accordance with an embodiment of the invention.

Referring next to FIG. 6, a flow diagram is provided illustrating an exemplary functionality of a master orchestrator during the first stage. As illustrated, process 600 begins at act 610 where the master orchestrator sets the environment type so as to identify the specific CP environment, which facilitates downloading and configuring CP-specific binaries, if any. At act 620, the SDCC software packages are then downloaded and initialized based on the URL that is passed for the N and N−1 SDCC releases which are being tested. Here, it is contemplated that the extracted SDCC software package goes through SHA validation followed by extraction to a specific format required by the POD service for patching. Process 600 then proceeds to act 630 where the master orchestrator installs any corresponding dependencies. Next, at act 640, the bring up pipeline is triggered, which consumes the CP's fleet manager API (or from a pool of predefined servers) to retrieve a set of hardware to deploy an SDDC with the bits that were downloaded at act 620. At act 650, before deploying the SDDC, the fetched hosts may be directly patched via the ESXCLI (ESX command line interface) using the extracted repository to the levels of the current N release. Post bring-up, it should be appreciated that the master orchestrator may run through the validation suite and generate a report, wherein the validation makes sure that the deployed SDDC on the CP's hardware is as per the CRD (Certified Reference Design). Here, it is contemplated that both a configuration validation and a functional check may be performed by deploying VMs, testing high availability (HA), etc. At act 660, subsequent stages validate the LCM activities of Patch & Upgrade, Add/Remove Host and Cluster. For the patch flow, the hosts are cleaned by returning them back to the host pool. A fresh set of hosts are then fetched and a bring up with the N−1 SDCC release bits is performed which is then patched to the N SDCC release, thus validating a patching process from N−1 to N. At act 670, the logs are then encrypted, archived, and pushed to an S3 repository, wherein each CP may get its own dedicated bucket, wherein access to each of the logs and buckets may be controlled by a security policy. Process 600 then concludes at act 680 where the SDCC developer is notified.

In an aspect of the disclosure, it is contemplated that each act of process 600 may be deemed a pipeline by itself, wherein each pipeline may be customized by the CP via integrations points. By default, the integrations points may be disabled. If a CP requires customization for a specific pipeline, the CP can enable a specific integration point and specify and external pipeline which the master orchestrator will now trigger as part of the process. It should also be appreciated that export/import functionality is contemplated so that CP-defined extensions can be readily ported to the second stage. Once the bits of a particular SDCC release are validated through the first and second stages, they may be tagged and persisted in a golden repository which can now be used for production deployments and LCM actions.

Figure 7:
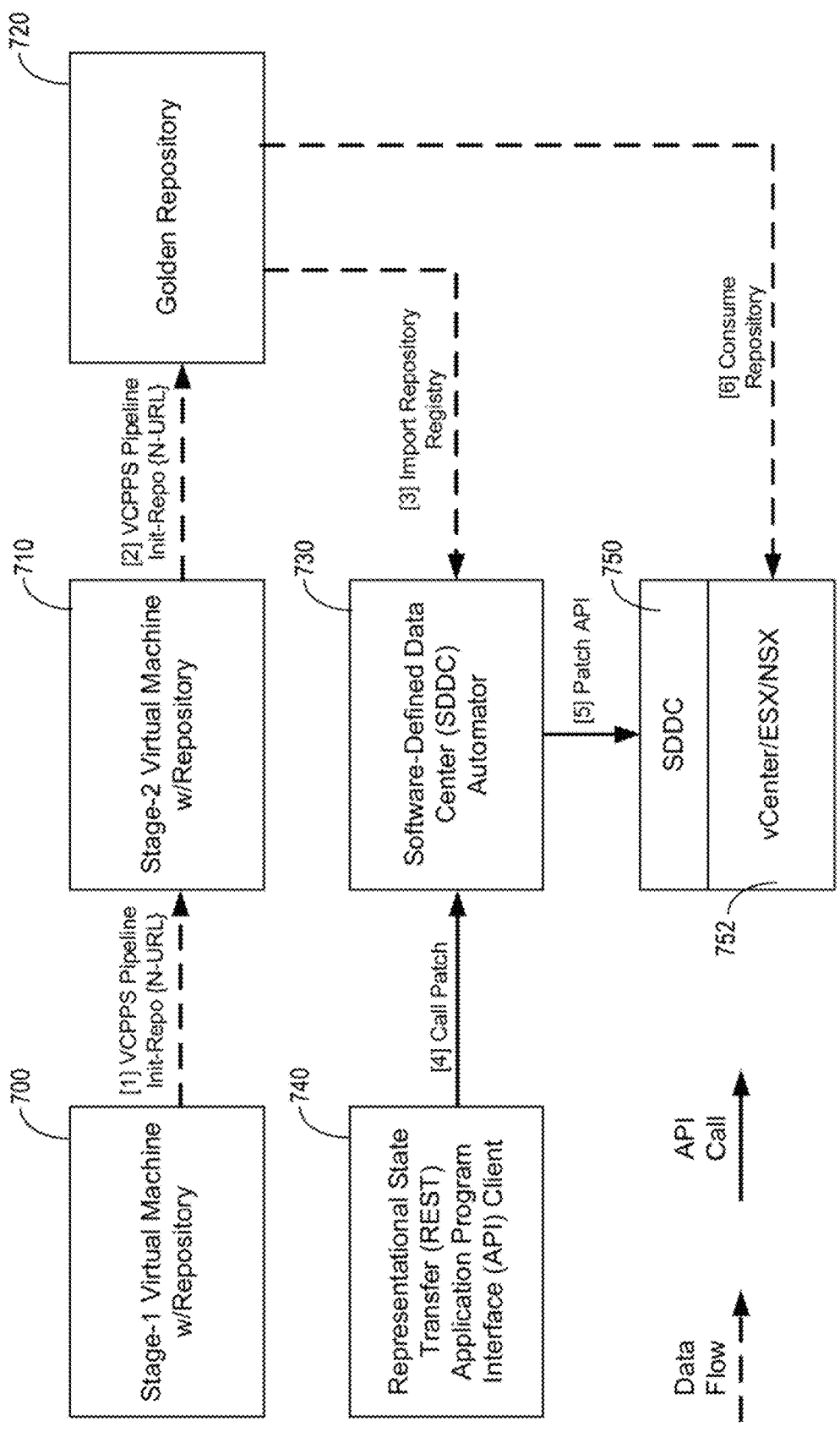
FIG. 7 is a block diagram of an exemplary delivery engine appliance in accordance with an embodiment of the invention.

Referring next to FIG. 7, an exemplary delivery engine appliance is illustrated in accordance with an aspect of the invention. As illustrated, it is contemplated that a first virtual machine 700 is configured to provide a platform where the stage-1 logic is executed. Such logic may include, for example, the stage-1 validation pipelines, the validation test implementations, and logic associated with the SDDC Automator 730. The software components are packaged and executed as individual docker containers within the stage-1 virtual machine 700. The stage-1 virtual machine may also host a local copy of the downloaded SDDC binaries (e.g., from a VMware-hosted repository), exposing them via an HTTP interface and thus acting as a local repository for the stage-1 process.

As illustrated, a second virtual machine 710 is also contemplated, wherein the second virtual machine 710 is configured to provide a platform where the stage-2 logic is executed, and where the second virtual machine 710 is configured to execute binaries similar to the stage-1 environment. However, it should be noted that a difference between the stage-1 environment is that the stage-2 logic permits customization to cater to specific cloud provider environments, which facilitates solving the variable characteristic of SDDC deployment across cloud providers. Namely, it is contemplated that the stage-1 procedure will post successful validation copies of the SDDC binaries to a stage-2 repository, which are then exposed via an HTTP interface, thus acting as a local repository for the stage-2 process. Any additional third party binaries that are partner-specific over and above the ones published by a software deployment management system (e.g., VMware) can be included in the stage-2 repository by the cloud provider (e.g., device drivers including network and storage driver VIBs, third-party solution components, etc. may be hosted at the stage-2 repository in additional to the validated stage-1 bits).

As illustrated, a golden repository 720 is also contemplated, which is a cloud provider-hosted repository. The golden repository 720 may be configured to get its binaries from the stage-2 repository upon successful validation of the binaries through the first two stages. These binaries, once hosted in the golden repository 720, are available for general consumption by live/production workload SDDCs catering to end user/customers of the cloud provider.

As previously stated, an SDDC Automator 730 may also be included. In a particular embodiment, the SDDC Automator 730 is the core engine of the SDDC delivery process, wherein the SDDC Automator 730 has the functional capability to configure and deploy an SDDC, perform lifecycle operations like adding, removing hosts and cluster, perform software patching of the SDDC etc. The SDDC-automator 730 may be further configured to consume binaries from the hosted repository, and to call APIs (e.g., a patch API) from a REST API client 740, as shown. It is also contemplated that the first and second virtual machines, 700 and 710, may technically have an internal running instance of the SDDC Automator 730 which is consumed by the validation pipeline.

As illustrated, the logical production of the SDDC Automator 730 is an SDDC 750. Here, it is contemplated that the SDDC may be part of a software stack, which also includes ESX, vCenter, NSX, etc. 752 over certified hardware.

It should be appreciated that, although the delivery engine appliance illustrated in FIG. 7 may be configured to facilitate various aspects of the first stage, it is contemplated that its capabilities can further be leveraged for fleet-management functions. For instance, the delivery engine appliance may be configured to facilitate centralized deployment, wherein a single delivery engine appliance manages more than one SDDC, or where one delivery engine appliance is deployed per SDDC. Also, it is contemplated that the delivery engine appliance can consume repositories directly from the golden repository 720 for patch operation. To perform a bring up, for example, the repositories may be copied locally to the delivery engine appliance.

In another aspect, it is contemplated that the delivery engine appliance may be configured to host a REST API for consumption by the fleet manager. Here, the APIs may essentially consume the open source automation pipeline (e.g., a Jenkins pipeline), wherein all earlier configured extensions may now also be exposed via the REST API.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, non-volatile memory, NVMe device, persistent memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method comprising:
   receiving a software-defined data center (SDDC) software package at a public cloud computing environment, wherein the SDDC software package facilitates creating an SDDC on a plurality of host computers;
   performing a first test of the SDDC via a first testing server, wherein the first test comprises a generic deployment of the SDDC software package on the plurality of host computers, and wherein the first test is a generic test of the SDCC corresponding to the generic deployment of the SDCC software package;
   performing a second test of the SDDC via a second server in response to passing the first test, wherein the second test comprises a custom deployment of the SDDC software package on the plurality of host computers, and wherein the second test is a custom test of the SDCC corresponding to the custom deployment of the SDCC software package; and
   validating a usability of the SDCC based on at least one of the first test or the second test.

2. The computer-implemented method of claim 1, further comprising automating a plurality of lifecycle workflows included in the SDDC software package.

3. The computer-implemented method of claim 2, wherein the plurality of lifecycle workflows included in the SDDC software package are extensible.

4. The computer-implemented method of claim 3, wherein the custom deployment comprises deploying a revised version of the plurality of lifecycle workflows included in the SDDC software package.

5. The computer-implemented method of claim 4, wherein the custom deployment comprises adding a new lifecycle workflow to the plurality of lifecycle workflows included in the SDDC software package.

6. The computer-implemented method of claim 4, wherein the custom deployment comprises deleting at least one of the plurality of lifecycle workflows included in the SDDC software package.

7. The computer-implemented method of claim 4, wherein the custom deployment comprises revising at least one of the plurality of lifecycle workflows included in the SDDC software package.

8. A non-transitory computer-readable storage medium containing program instructions, wherein execution of the program instructions by one or more processors of a computer causes the one or more processors to perform steps comprising:
   receiving a software-defined data center (SDDC) software package at a public cloud computing environment, wherein the SDDC software package facilitates creating an SDDC on a plurality of host computers;
   performing a first test of the SDDC via a first testing server, wherein the first test comprises a generic deployment of the SDDC software package on the plurality of host computers, and wherein the first test is a generic test of the SDCC corresponding to the generic deployment of the SDCC software package;
   performing a second test of the SDDC via a second server in response to passing the first test, wherein the second test comprises a custom deployment of the SDDC software package on the plurality of host computers, and wherein the second test is a custom test of the SDCC corresponding to the custom deployment of the SDCC software package; and
   validating a usability of the SDCC based on at least one of the first test or the second test.

9. The non-transitory computer-readable storage medium of claim 8, wherein the steps further comprise automating a plurality of lifecycle workflows included in the SDDC software package.

10. The non-transitory computer-readable storage medium of claim 9, wherein the plurality of lifecycle workflows included in the SDDC software package are extensible.

11. The non-transitory computer-readable storage medium of claim 10, wherein the custom deployment comprises deploying a revised version of the plurality of lifecycle workflows included in the SDDC software package.

12. The non-transitory computer-readable storage medium of claim 11, wherein the custom deployment comprises adding a new lifecycle workflow to the plurality of lifecycle workflows included in the SDDC software package.

13. The non-transitory computer-readable storage medium of claim 11, wherein the custom deployment comprises deleting at least one of the plurality of lifecycle workflows included in the SDDC software package.

14. The non-transitory computer-readable storage medium of claim 11, wherein the custom deployment comprises revising at least one of the plurality of lifecycle workflows included in the SDDC software package.

15. A computer system comprising:
memory; and
one or more processors configured to:
receive a software-defined data center (SDDC) software package at a public cloud computing environment, wherein the SDDC software package facilitates creating an SDDC on a plurality of host computers;
perform a first test of the SDDC via a first testing server, wherein the first test comprises a generic deployment of the SDDC software package on the plurality of host computers, and wherein the first test is a generic test of the SDCC corresponding to the generic deployment of the SDCC software package;
perform a second test of the SDDC via a second server in response to passing the first test, wherein the second test comprises a custom deployment of the SDDC software package on the plurality of host computers, and wherein the second test is a custom test of the SDCC corresponding to the custom deployment of the SDCC software package; and
validate a usability of the SDCC based on at least one of the first test or the second test.

16. The system of claim 15, wherein the one or more processors are configured to automate a plurality of lifecycle workflows included in the SDDC software package.

17. The system of claim 16, wherein the one or more processors are configured to control an automation of the plurality of lifecycle workflows via commands received from an external controller.

18. The system of claim 16, wherein the plurality of lifecycle workflows included in the SDDC software package are extensible.

19. The system of claim 18, wherein the custom deployment comprises deploying a revised version of the plurality of lifecycle workflows included in the SDDC software package.

20. The system of claim 16, wherein the one or more processors are configured to utilize:
at least a first of the plurality of host computers to facilitate calling an SDDC instance;
at least a second of the plurality of host computers to facilitate testing an addition or removal of host computers; and
at least a third of the plurality of host computers to facilitate testing a revision of the plurality of lifecycle workflows included in the SDDC software package.

* * * * *